US011067677B2

(12) United States Patent
Christiansen et al.

(10) Patent No.: US 11,067,677 B2
(45) Date of Patent: Jul. 20, 2021

(54) ULTRASOUND IMAGING TRANSDUCER ARRAY WITH INTEGRATED APODIZATION

(71) Applicant: B-K Medical Aps, Herlev (DK)

(72) Inventors: Thomas Lehrmann Christiansen, Copenhagen (DK); Morten Fischer Rasmussen, Copenhagen (DK); Erik Vilain Thomsen, Lynge (DK); Jorgen Jensen, Horsholm (DK)

(73) Assignee: BK MEDICAL APS, Herlev (DK)

( * ) Notice: Subject to any disclaimer, the term of this patent is extended or adjusted under 35 U.S.C. 154(b) by 247 days.

(21) Appl. No.: 16/411,548

(22) Filed: May 14, 2019

(65) Prior Publication Data

US 2019/0265344 A1 Aug. 29, 2019

Related U.S. Application Data

(63) Continuation of application No. 15/105,633, filed as application No. PCT/IB2013/002838 on Dec. 19, 2013, now Pat. No. 10,330,781.

(51) Int. Cl.
G01S 7/00 (2006.01)
G01S 7/52 (2006.01)
G01S 15/89 (2006.01)
G10K 11/34 (2006.01)
(Continued)

(52) U.S. Cl.
CPC ........ G01S 7/52046 (2013.01); B06B 1/0215 (2013.01); B06B 1/0292 (2013.01); B06B 1/0629 (2013.01); G01S 7/5202 (2013.01); G01S 7/52025 (2013.01); G01S 7/52077 (2013.01); G01S 7/52079 (2013.01); G01S 7/52085 (2013.01); G01S 15/8913 (2013.01); G01S 15/8915 (2013.01); G01S 15/8925 (2013.01); G01S 15/8927 (2013.01);
(Continued)

(58) Field of Classification Search
USPC .......................................................... 367/7
See application file for complete search history.

(56) References Cited

U.S. PATENT DOCUMENTS 6,527,723 B2 * 3/2003 Ossmann ............. G10K 11/348
128/916
6,641,534 B2 * 11/2003 Smith .................... A61B 8/145
600/437

(Continued)

Primary Examiner — James R Hulka
(74) Attorney, Agent, or Firm — Anthony M. Del Zoppo, III; Daugherty & Del Zoppo Co. LPA

(57) ABSTRACT

A transducer array (802) includes at least one 1D array of transducing elements (804). The at least one 1D array of transducing elements includes a plurality of transducing elements (904). A first of the plurality of transducing elements has a first apodization and a second of the plurality of transducing elements has a second apodization. The first apodization and the second apodization are different. The transducer array further includes at least one electrically conductive element (910) in electrical communication with each of the plurality of transducing elements. The transducer array further includes at least one electrical contact (906) in electrical communication with the at least one electrically conductive element. The at least one electrical contact concurrently addresses the plurality of transducing elements through the at least one electrically conductive element.

16 Claims, 13 Drawing Sheets

(51) Int. Cl.
 *B06B 1/02* (2006.01)
 *B06B 1/06* (2006.01)
(52) U.S. Cl.
 CPC ........ *G10K 11/346* (2013.01); *B06B 2201/76* (2013.01); *G01S 7/5208* (2013.01)

(56) References Cited

U.S. PATENT DOCUMENTS

| | | | | |
|---|---|---|---|---|
| 6,795,374 | B2* | 9/2004 | Barnes | G01S 7/52038 367/138 |
| 8,744,155 | B2* | 6/2014 | Walker | G01S 7/52046 382/131 |
| 10,330,781 | B2* | 6/2019 | Christiansen | B06B 1/0292 |
| 10,618,078 | B2* | 4/2020 | Zhao | B06B 1/0292 |
| 10,806,432 | B2* | 10/2020 | Jensen | A61B 8/54 |
| 2001/0051771 | A1* | 12/2001 | Bradley | G01S 7/52046 600/443 |
| 2002/0198455 | A1* | 12/2002 | Ossmann | G10K 11/348 600/459 |
| 2003/0048698 | A1* | 3/2003 | Barnes | G01S 7/52038 367/181 |
| 2003/0144591 | A1* | 7/2003 | Smith | A61B 8/145 600/437 |
| 2004/0044284 | A1* | 3/2004 | Von Behren | G01S 7/52046 600/444 |
| 2004/0054285 | A1* | 3/2004 | Freiburger | G01S 7/52046 600/447 |
| 2005/0219096 | A1* | 10/2005 | Freeman | G01S 7/5208 341/143 |
| 2006/0058672 | A1* | 3/2006 | Klepper | G01S 15/8915 600/447 |
| 2006/0100520 | A1* | 5/2006 | Mo | A61B 8/462 600/457 |
| 2007/0088213 | A1* | 4/2007 | Poland | G10K 11/34 600/437 |
| 2007/0161899 | A1* | 7/2007 | Barnes | G01S 15/8997 600/447 |
| 2008/0021324 | A1* | 1/2008 | Seto | G01S 7/5208 600/447 |
| 2008/0024359 | A1* | 1/2008 | Watkins | G01S 13/89 342/25 A |
| 2009/0299184 | A1* | 12/2009 | Walker | G06T 5/009 600/447 |
| 2017/0003384 | A1* | 1/2017 | Christiansen | G01S 7/52025 |
| 2018/0015504 | A1* | 1/2018 | Zhao | B06B 1/0207 |
| 2018/0271493 | A1* | 9/2018 | Jensen | B06B 1/0215 |
| 2019/0361102 | A1* | 11/2019 | Price | G01S 7/52034 |

* cited by examiner

ULTRASOUND IMAGING TRANSDUCER ARRAY WITH INTEGRATED APODIZATION

TECHNICAL FIELD

The following generally relates to a transducer array and more particularly to an ultrasound imaging transducer array with integrated apodization.

BACKGROUND

Ultrasound imaging has been used to determine information about the interior characteristics of an object or a subject. Generally, an ultrasound imaging system includes a transducer array and components for at least generating and transmitting ultrasound waves, receiving echoes or reflected waves, processing the received signal, generating images, and displaying the images. The transducer array may include a one-dimensional (1D) array of elements or a two-dimensional (2D) transducer array of elements.

For three dimensional (3D) imaging with a 2D transducer array, the elements can be addressed element-wise where each element is individually addressed. Alternatively, the elements can be addressed group-wise, e.g., using row-column addressing. In a configuration in which each element is individually addressed, an N×N array of elements would require N×N (or $N^2$) electrical connections and channels to fully address the array. With row-column addressing, an N×N array of elements can be operated using 2N electrical connections and channels to fully address the array.

As such, the row-column addressing approach can simplify fabrication of the transducer array, for example, due to the reduced number of electrical interconnects to the transducer array (e.g., from N×N to 2N). Furthermore, the data bandwidth requirements are also reduced. Unfortunately, the row-column addressing approach may introduce ghost artifact in the images, for example, because of the significant element height, the lack of an acoustic lens, and the lack of electronic control along the length of the row/column elements.

A non-limiting example of row-column addressing of a 2D transducer array 100 is shown in FIGS. 1 and 2. In FIG. 1, each 1D array 102, 104, and 106 of elements (three elements in the illustrated embodiment) in a first direction (y in the illustrated embodiment) respectively is excited with a single pulse 108, 110, and 112 in transmit. In FIG. 2, a single signal 202, 204, and 206 respectively is produced for each 1D array 208, 210, and 212 of elements (three elements in the illustrated embodiment) in a second different direction (x in the illustrated embodiment, where x is transverse to y) in receive.

FIGS. 3, 4, 5, 6, and 7 provide an example of ghost artifact originating during both receive and transmit in connection with the 1D arrays 208-212 of FIG. 2. For sake of brevity, this example is described with respect to the array 208 in receive. However, the same edge effect arises in transmit due to the receive/transmit reciprocity of the sound field. In FIG. 3, when an emitted waveform is reflected by a point scatterer 304, the reflected wave will have the shape of a sphere 300. At a first time 306 thereafter, the reflected spherical wave 300 intersects only a first subset 308 of elements of the array 208 of the 1D array. FIG. 4 shows the response 402 of the 1D array and the corresponding output signal 404, which is a sum of the measured signals, which are approximately in phase, producing a strong output signal.

Returning to FIG. 3, subsequently, at time 310, the reflected wave 300 intersects with a second subset 312 of elements of the array 208. Where the amplitude of the transmit waveform is symmetric around zero, which it typically is in at least medical ultrasound, the integration of the output is close to zero. FIG. 5 shows the response 502 of the array 208 and the corresponding output signal 504 at time 310. Returning to FIG. 3, subsequently, at time 314, the reflected wave crosses edges 316. FIG. 6 shows the response 602 of the array 208 and the corresponding output signal 604 at time 314.

From the above, during receive, a point scatterer will receive three pressure waves: one main wave and one from each edge of the 1D array. Each of these three waves is reflected and each generates three signals during receive: One main, and one at each edge of the 1D array. Thus, a total of nine signals are generated from one point scatterer. However, only one of these is of interest (the main echo, i.e. the shortest distance from the array to the point scatterer). The remaining eight echoes are artifacts that, in general, are seen as ghosts (three pairs and two single).

Where the point scatterer is located directly above the center of the 1D array (the scenario shown in FIG. 3), the number of ghosts collapses to two (each containing four of the eight artifacts). This is shown in FIG. 7, which shows a main wave 702, and two ghost waves 704 and 706. In the example shown in FIG. 3-7, row-column addressing results in a main lobe at the center at 0 dB, and, beneath it, two ghosts as a result of edge effects on the long row and column elements. Unfortunately, the ghosts introduce artifact, degrading image quality.

SUMMARY

Aspects of the application address the above matters, and others.

In one aspect, a transducer array includes at least one 1D array of transducing elements. The at least one 1D array of transducing elements includes a plurality of transducing elements. A first of the plurality of transducing elements has a first apodization and a second of the plurality of transducing elements has a second apodization. The first apodization and the second apodization are different. The transducer array further includes at least one electrically conductive element in electrical communication with each of the plurality of transducing elements. The transducer array further includes at least one electrical contact in electrical communication with the at least one electrically conductive element. The at least one electrical contact concurrently addresses the plurality of transducing elements through the at least one electrically conductive element.

In another aspect, a method includes transmitting an ultrasound waveform with a transducer array that includes apodization that is integrated into physical elements of the transducer array. The method further includes receiving a reflected wave with the transducer array. The method further includes processing the received reflected wave to generate at least one image.

In another aspect, an ultrasound imaging system includes a transducer array with an array-wise addressable array of elements that includes at least two elements with a different apodization. The apodization is one of a fixed area controlled apodization, a dynamic area controlled apodization, a fixed bias controlled apodization, or a dynamic bias controlled apodization. The ultrasound imaging system further includes transmit circuitry that conveys an excitation pulse to the transducer array. The ultrasound imaging system further includes receive circuitry that receives a signal indicative of an ultrasound echo from the transducer array.

The ultrasound imaging system further includes a beamformer that processes the received signal, generating ultrasound image data.

Those skilled in the art will recognize still other aspects of the present application upon reading and understanding the attached description.

BRIEF DESCRIPTION OF THE DRAWINGS

The application is illustrated by way of example and not limited by the figures of the accompanying drawings, in which like references indicate similar elements and in which.

DETAILED DESCRIPTION

Figure 8:
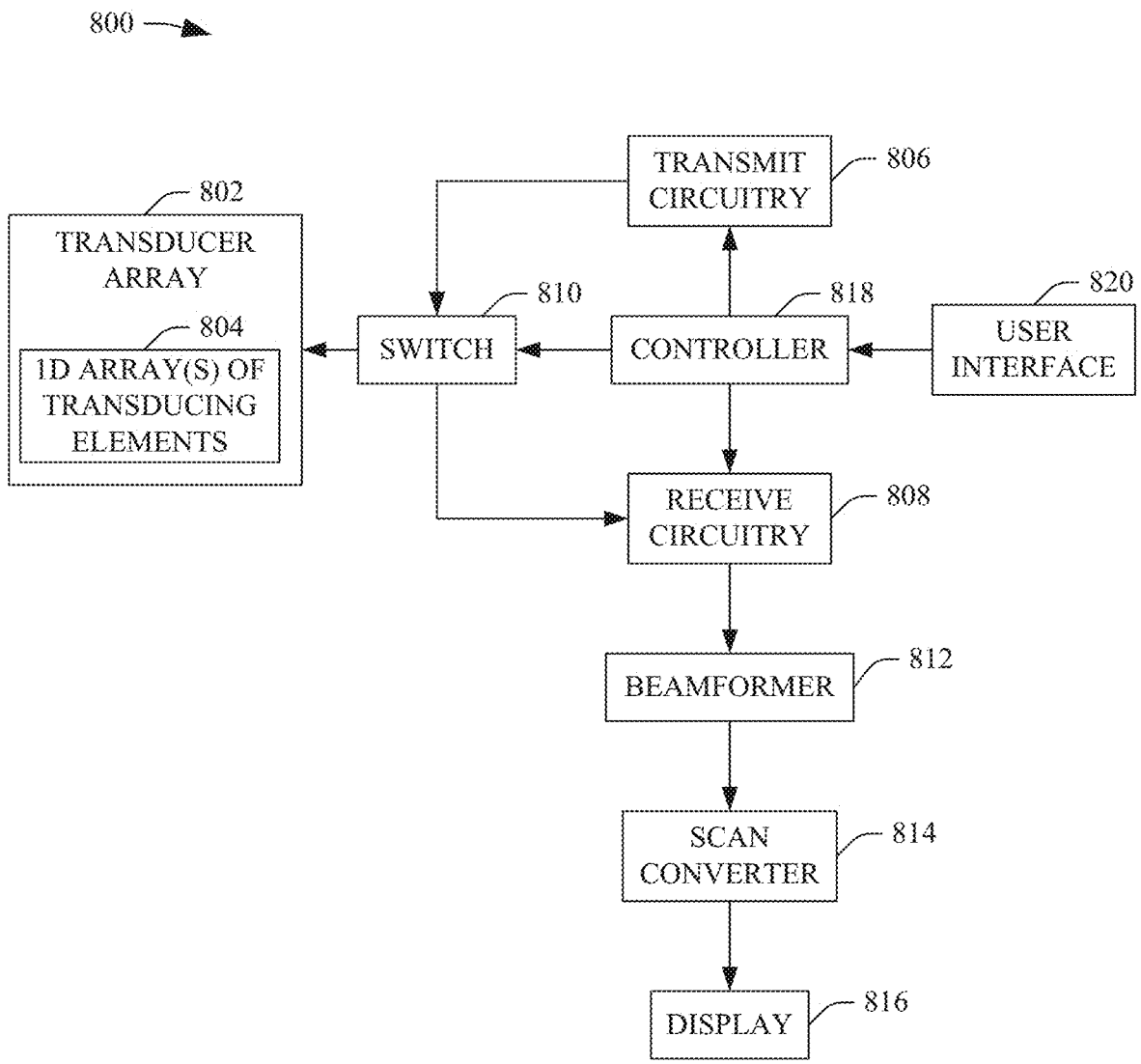
FIG. 8 schematically illustrates an example ultrasound imaging system with a transducer array with integrated apodization.

FIG. 8 schematically illustrates an example ultrasound imaging system 800.

The ultrasound imaging system 800 includes a transducer array 802 that includes at least one 1D array of transducing elements 804. The at least one 1D array of transducing elements 804 is configured to transmit ultrasound signals when in transmit mode and receive echoes, reflected waveforms, etc. when in receive mode. In one non-limiting instance, the at least one 1D array of transducing elements 804 includes a 2D array of two or more 1D arrays. An example 2D array includes a 16×16 array, a 32×32 array, a 64×64 array, a larger array, or a smaller array. In another embodiment, the at least one 1D array of transducer elements 804 includes a non-square array such as rectangular, circular array, and/or other shaped arrays. In yet another instance, the array of transducing elements 804 includes only a single 1D array of transducing elements.

As described in greater detail below, the at least one 1D array of transducer elements 804 includes integrated apodization, or apodization that is integrated in and part of the physical transducing elements themselves. In one instance, the integrated apodization, e.g., weights end or peripheral regions of each 1D array of transducing elements lower than other regions (e.g., more central regions) of the at least one 1D array of transducer elements 804. This may reduce or mitigate the artifacts such as the ghost artifacts such as from the edges of a transducer array as discussed in connection with FIGS. 3-7 and/or other artifacts. Examples of such apodization include, but are not limited to, area (fixed and dynamic) and/or voltage bias (fixed and dynamic) controlled apodization. These approaches can be used with different types of transducing elements such as piezoelectric, capacitive micro machined ultrasonic transducer (CMUT), and/or other transducing elements.

Transmit circuitry 806 generates pulses that excite a predetermined set of addressed 1D arrays of the at least one 1D array of transducer elements 804 to emit one or more ultrasound beams or waves into a scan field of view. Receive circuitry 808 receives echoes or reflected waves, which are generated in response to the transmitted ultrasound beam or wave interacting with (stationary and/or flowing) structure in the scan field of view, from a predetermined set of addressed arrays of the at least one 1D array of transducer elements 804. A switch 810 switches between the transmit circuitry 806 and the receive circuitry 808, depending on whether the transducer array 802 is being operated in transmit or receive mode. In transmit mode, the switch 810 electrically connects the transmit circuitry 806 to the at least one 1D array of transducer elements 804. In receive mode, the switch 810 electrically connects the receive circuitry 808 to the at least one 1D array of transducer elements 804.

A beamformer 812 processes the received echoes, for example, by applying time delays and weights, summing, and/or otherwise processing the received echoes. In one non-limiting instance, the beamformer 812 includes a single sub-beamformer for each of the at least one 1D array of transducer elements 804. In another instance, more than a single sub-beamformer can be used with a 1D array and/or a single sub-beamformer can be used two more of the 1D arrays. A scan converter 814 scan converts the beamformed data, converting the beamformed data (e.g., images) into the coordinate system of a display 816, which visually displays the data. In one instance, the data is visually displayed in an interactive graphical user interface (GUI), which allows the user to selectively rotate, scale, and/or manipulate the displayed data through a mouse, a keyboard, touch-screen controls, etc.

A controller 818 controls one or more of the components of the system 800 such as at least one of the transmit circuitry 806 or receive circuitry 806, the switch 810 based on whether the at least one 1D array of transducer elements 804 is transmitting or receiving, etc. Such control can be based on available modes of operation (e.g., B-mode, C-mode, Doppler, etc.) of the system 800. A user interface 820 includes include one or more input devices (e.g., a button, a knob, a slider, a touch pad, etc.) and/or one or more output devices (e.g., a display screen, lights, a speaker, etc.). A particular mode, scanning, and/or other function can be activated by one or more signals indicative of input from the user interface 820. The user interface 820 can also be used to set and/or change parameters such as imaging parameters, processing parameters, display parameters, etc.

In one instance, the transducer array 802 is part of a probe and the transmit circuitry 806, the receive circuitry 808, the switch 810, the beamformer 812, the scan converter 814, the controller 818, the user interface 820, and the display 816 are part of a console. Communication there between can be through a wired (e.g., a cable and electro-mechanical interfaces) and/or wireless communication channel. In this instance, console can be similar to a portable computer such as a laptop, a notebook, etc., with additional hardware and/or software for ultrasound imaging. The console can be docked to a docketing station and used.

Alternatively, the console can be part (fixed or removable) of a mobile or portable cart system with wheels, casters, rollers, or the like, which can be moved around. In this instance, the display 816 may be separate from the console and connected thereto through a wired and/or wireless communication channel. Where the cart includes a docking interface, the laptop or notebook computer type console can be interfaced with the cart and used. An example of a cart system where the console can be selectively installed and removed is described in US publication 2011/0118562 A1, entitled "Portable ultrasound scanner," and filed on Nov. 17, 2009, which is incorporated herein in its entirety by reference.

Alternatively, the transducer 802, the transmit circuitry 806, the receive circuitry 808, the switch 810, the beamformer 812, the scan converter 814, the controller 818, the user interface 820, and the display 816 are all housed and enclosed within a hand-held ultrasound apparatus, with a housing that mechanically supports and/or shields the components within. In this instance, the transducer 802 and/or display 816 are also part of the housing, being structurally integrated or part of a surface or end of the hand-held ultrasound apparatus. An example of a hand-held device is described in U.S. Pat. No. 7,699,776, entitled "Intuitive Ultrasonic Imaging System and Related Method Thereof," and filed on Mar. 6, 2003, which is incorporated herein in its entirety by reference.

As briefly discussed above, the at least one 1D array of transducer elements 804 includes integrated apodization, including, but not limited to, fixed area controlled apodization, dynamic area controlled apodization, fixed bias controlled apodization, and dynamic bias controlled apodization. Non-limiting examples of each of these are discussed below.

Figure 9:
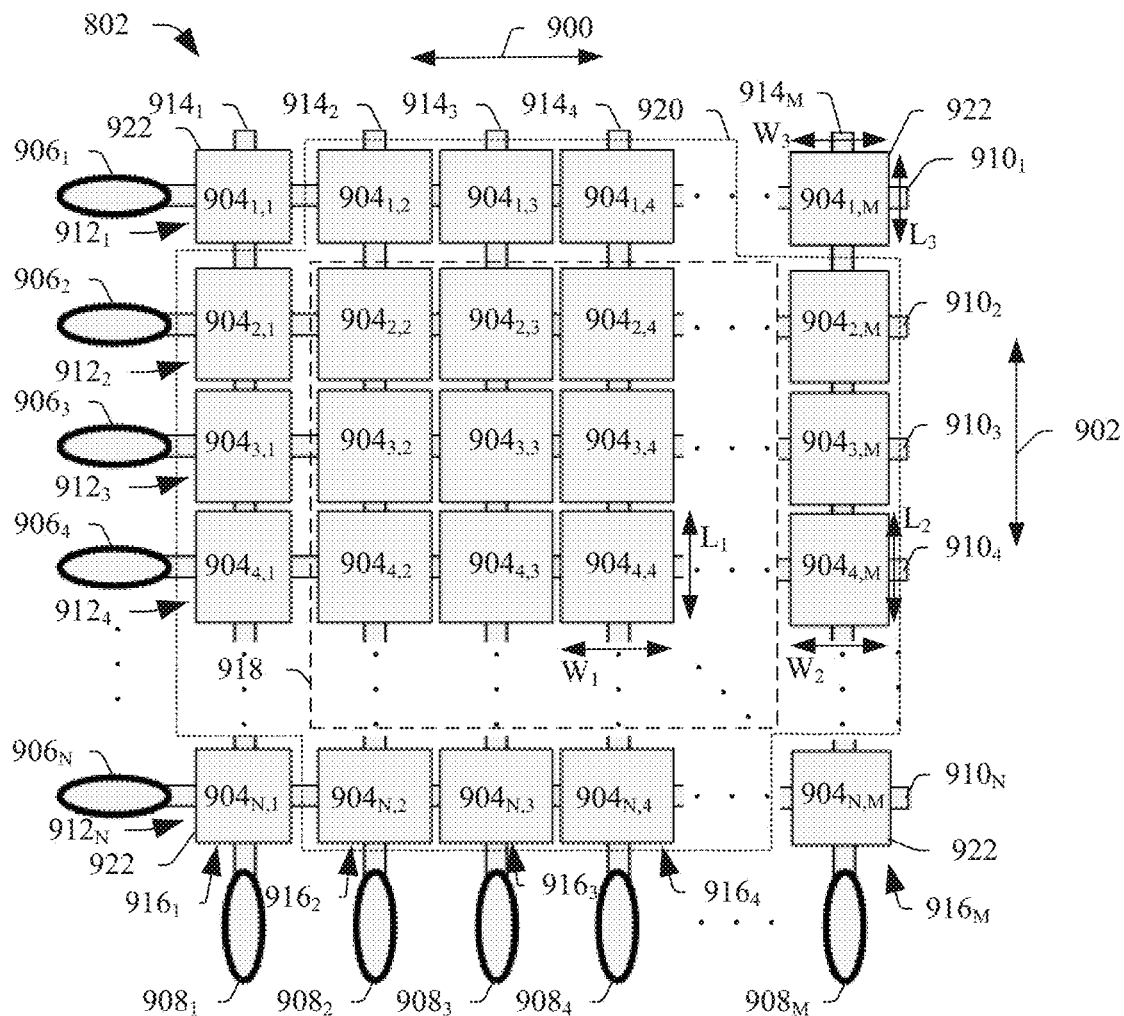
FIG. 9 schematically illustrates an example of fixed area controlled apodization in connection with rectangular piezoelectric elements.
Figure 10:
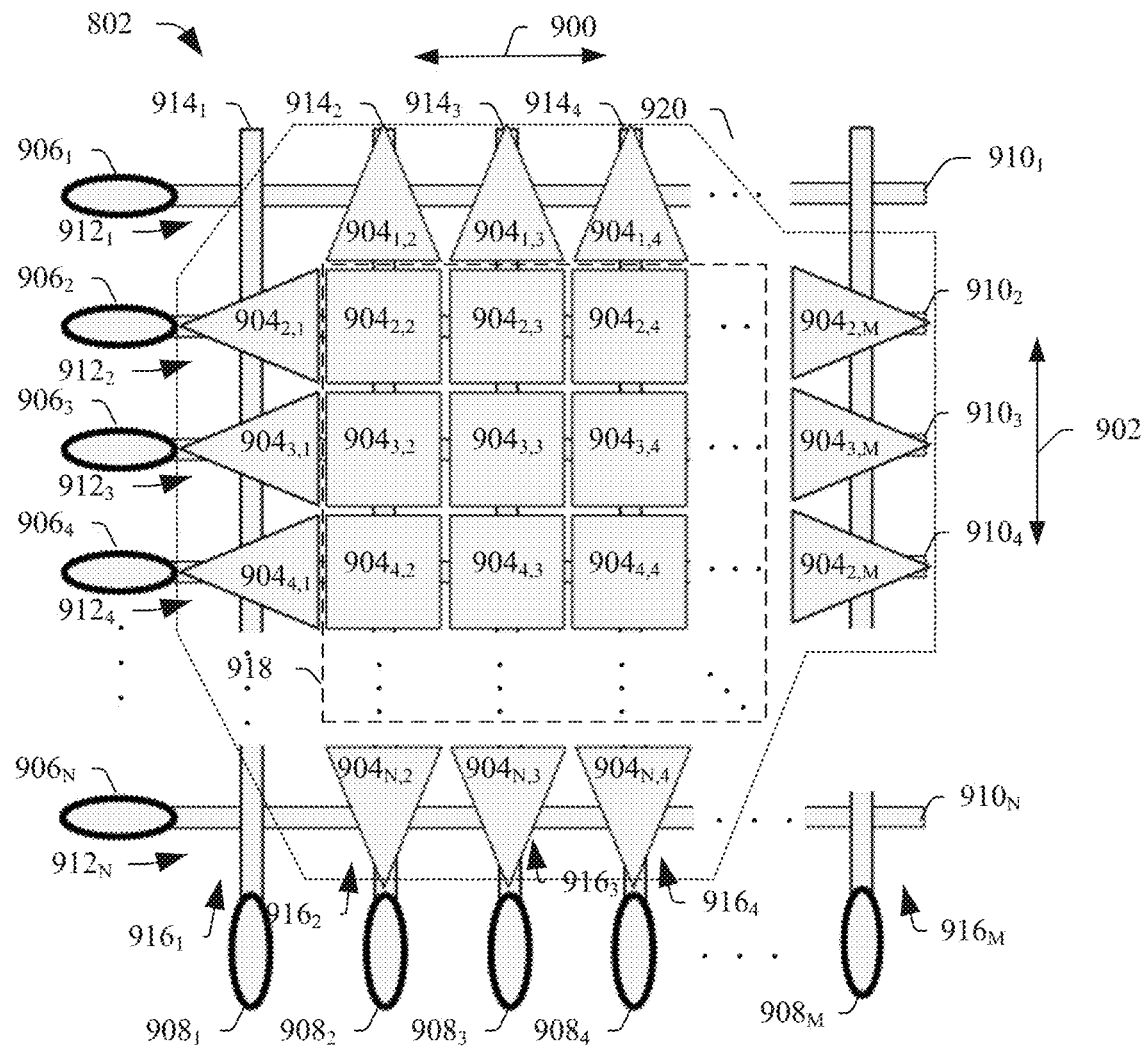
FIG. 10 schematically illustrates an example of fixed area controlled apodization in connection with rectangular and triangular piezoelectric elements.
Figure 11:
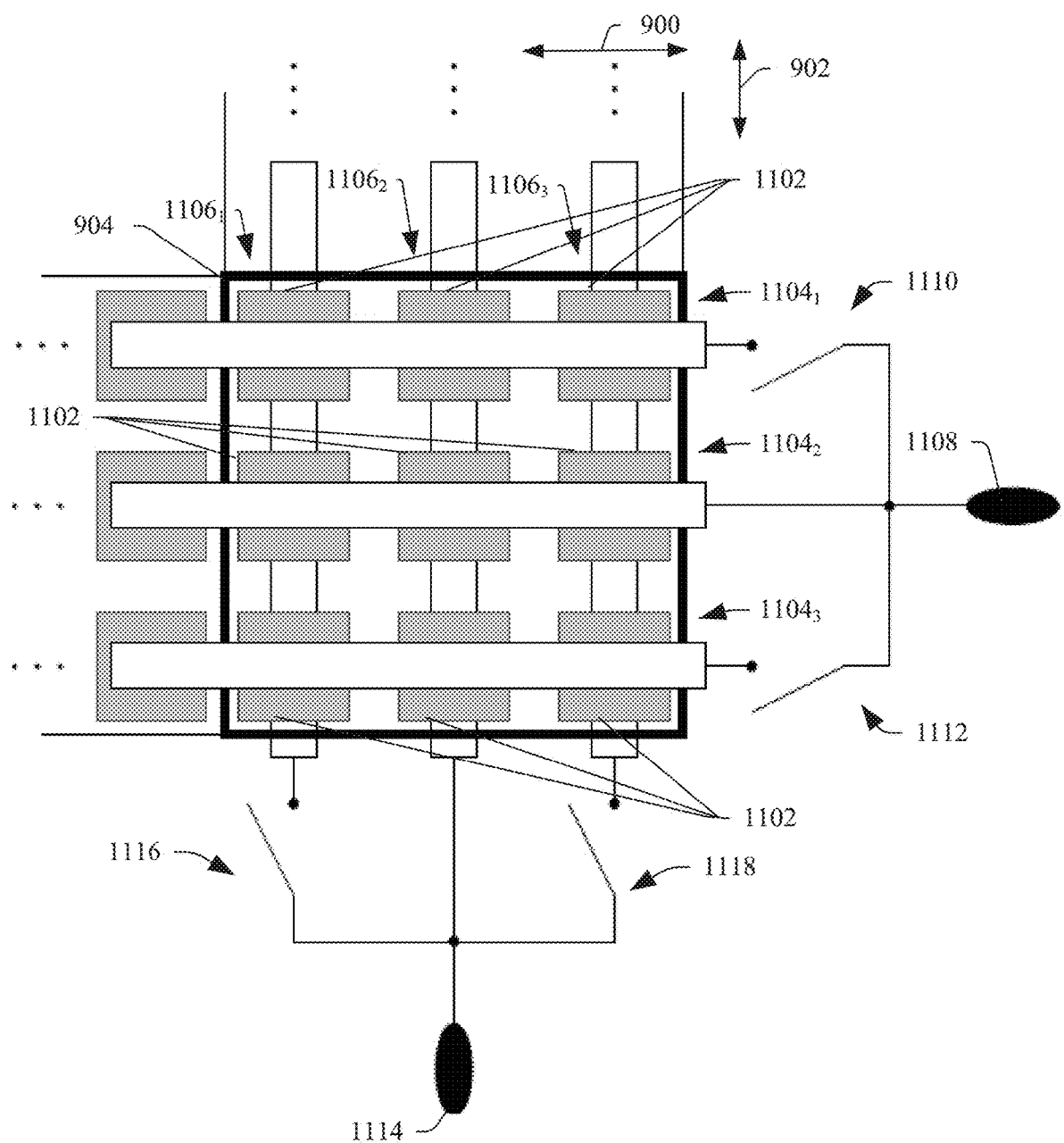
FIG. 11 schematically illustrates an example of dynamic area controlled apodization in connection with a piezoelectric 2D transducer array.

FIGS. 9, 10, and 11 show examples of area controlled apodization where the transducer array 802 includes a piezoelectric transducer array. FIG. 9 illustrates fixed area controlled apodization where the elements include rectangular elements. FIG. 10 illustrates fixed area controlled apodization where the elements include rectangular and non-rectangular elements. FIG. 11 illustrates dynamic area controlled apodization. Generally, area-controlled apodization refers to apodization that is based on a physical area of a transducing surface of each element of each of the at least one 1D array of transducer elements 804. With area controller apodization, the transmit pressure and the signal generated during receive for each transducing element scale with the physical surface area of the transducing element.

For sake of clarity and explanatory purposes, a first direction 900 of the array 802 is referred to herein as a row, and a second direction 902 of the array 802 is referred to herein as a column, and the first direction is considered the transmit direction, and the second direction is considered the receive direction. However, the directions 900 and 902 respectively can alternatively refer to the column and the row and/or receive and transmit. In general, the first direction 900 and the second direction 902 are different directions, approximately perpendicular, as shown in FIG. 9, or otherwise angularly offset. Furthermore, transmit and/or receive can be performed in more than one direction.

Initially referring to FIG. 9, the transducer array 802 includes N×M transducing elements 904 (or elements $904_{1,1}, \ldots, 904_{N,M}$, where N and M are positive integers). In one instance, N=M. In another instance, N≠M. The transducer array 802 further includes N electrical contacts $906_1, \ldots, 906_N$, and M electrical contacts $908_1, \ldots, 908_M$.

The array 902 further includes an electrically conductive element $910_1$ that electrically connects the electrical contact $906_1$ to each of the elements $904_{1,1}, \ldots, 904_{1,M}$, forming a row line element $912_1$. Likewise, electrically conductive elements $910_2, 910_3, 910_4, \ldots 910_N$, respectively electrically connect the electrical contacts $906_2, 906_3, 906_4, \ldots 906_N$ to the elements $904_{2,1}, \ldots, 904_{2,M}, 904_{3,1}, \ldots, 904_{3,M}, 904_{4,1}, \ldots, 904_{4,M}, \ldots 904_{N,1}, \ldots, 904_{N,M}$, forming row line elements $912_2, 912_3, 912_4, \ldots, 912_N$.

Each of the row line element $912_1, 912_2, 912_3, 912_4, \ldots, 912_N$ is addressed via the corresponding electrically conductive element $906_1, 906_2, 906_3, 906_4, \ldots 906_N$. For example, an excitation signal at the electrically conductive element $906_1$ excites the entire row line element $912_1$, or the elements $904_{1,1}, \ldots, 904_{1,M}, \ldots$, an excitation signal at the electrically conductive element $906_N$ excites the entire row line element $912_N$, or the elements $904_{N,1}, \ldots 904_{N,M}$. In another example, receiving a signal from the electrically conductive element $906_1$ receives signals from the entire row line element $912_1$, or the elements $904_{1,1}, \ldots, 904_{1,M}, \ldots$, receiving a signal from the electrically conductive element $906_N$ receives signals from the entire row line element $912_N$, or the elements $904_{N,1}, \ldots, 904_{N,M}$.

The array 902 further includes an electrically conductive element $914_1$ that electrically connects the electrical contact $908_1$ to each of the elements $904_{1,1}, \ldots, 904_{N,1}$, forming a column line element $916_1$. Likewise, electrically conductive elements $914_2, 914_3, 914_4, \ldots 914_M$, respectively electrically connect the electrical contacts $908_2, 908_3, 908_4, \ldots 908_N$ to the elements $904_{2,1}, \ldots, 904_{2,M}, 904_{3,1}, \ldots, 904_{3,M}, 904_{4,1}, \ldots, 904_{4,M}, \ldots 904_{N,1}, \ldots, 904_{N,M}$, forming column line elements $916_2, 916_3, 916_4, \ldots, 916_N$.

Each of the column line element $916_1$, $916_2$, $916_3$, $916_4$, ..., $916_M$ is addressed via the corresponding electrically conductive element $908_1$, $908_2$, $908_3$, $908_4$, ..., $908_M$. For example, an excitation signal at the electrically conductive element $908_1$ excites the entire column line element $916_1$, or the elements $904_{1,1}$, ..., $904_{N,1}$, ..., an excitation signal at the electrically conductive element $908_M$ excites the entire column line element $916_M$, or the elements $904_{1,M}$, ..., $904_{N,M}$. In another example, receiving a signal from the electrically conductive element $908_1$ reads signal from the entire column line element $916_1$, or the elements $904_{1,1}$, ..., $904_{N,1}$, ..., receiving a signal from the electrically conductive element $908_M$ reads signals from the entire column line element $916_M$, or the elements $904_{1,M}$, ..., $904_{N,M}$.

A first group 918 of elements at a central region of the array 802 each have a first area $A_1$ ($W_1 * L_1$). A second group 920 of sub-elements (which excludes the first group 918) disposed along a perimeter or periphery of the array 802 each have a second area $A_2$ ($W_2 * L_2$). A third group of sub-elements 922 disposed at the corners of the array 802 each have a third area $A_3$ ($W_3 * L_3$). However, this configuration is not limiting. For example, in another embodiment, there may be more or less groups and/or different groups. Furthermore, in FIG. 9, the elements for all three of the groups 918, 920 and 922 is rectangular or square, and, in another embodiment, at least one of the sub-elements is otherwise shaped, such as circular, elliptical, triangular, hexagonal, etc.

In the illustrated embodiment, $W_1 > W_2 \approx W_3$ and $L_1 \approx L_2 > L_3$, However, this configuration is not limiting. Generally, the width (W) and length (L) of each element is such that $A_1 > A_2 > A_3$. The pressure output (the transmitted pressure), transmitted in response to an excitation signal (e.g., a voltage pulse) of an element with an area A (or W*L) is P. As such, the pressure output, due to excitation signal, of the elements of the first group 918, which have an area $A_1$, is $P_1$. The pressure output, due to excitation signal, of the elements of the second group 920, which have an area $A_2$, is $P_2$, where $P_2 = \alpha P_1$, where $\alpha = A_2/A_1$. The pressure output, due to excitation signal, of the elements of the third group, which have an area $A_3$, is $P_3$, where $P_3 = \beta P_1$, where $\beta = A_3/A_1$.

The signal output, generated by an element in response to an incident acoustical wave impinging thereon, for an element with an area A is S. As such, the signal output, due to an impinging acoustical wave, of the elements of the first group 918, which have an area $A_1$, is $S_1$. The signal output, due to an impinging acoustical wave, of the elements of the second group 920, which have an area $A_2$, is $S_2$, where $S_2 = \alpha S_1$, where $\alpha = A_2/A_1$. The signal output, due to an impinging acoustical wave, of the elements of the third group 922, which have an area $A_3$, is $S_3$, where $S_3 = \beta S_1$, where $\beta = A_3/A_1$.

With this configuration, the transmit pressure and/or the signal generated during transmit and receive scale with the transducing area of each element. In the illustrated embodiment, the scaling scales down the transmit pressure and the signal generated during receive going from the first group 918, to the second group 920, to the third group 922 of elements. Thus, a particular row line element or column line element includes fixed discrete area controlled apodization. Such apodization effectively down weights the output pressure transmitted by (during transmit) and the electrical signal generated by (during receive) at the ends of each row and/or column line element, mitigating or reducing ghost artifact introduced by the edge elements.

The configuration shown in FIG. 9, can be formed by through dicing, screen-printing (where the layout of each cell is defined by a mask), and/or other approach. Dicing is well suited for creating the rectangular sub-elements shown in FIG. 9. As the resonance frequency of piezo-elements is given by the height, the area can be freely adjusted without altering the operating frequency of each sub-element. This configuration allows for varying the transmitted/received signal of a single line element. For transmit, the amplitude of the excitation pulses need not be varied, so a fixed excitation pulse waveform at a single amplitude can be used. Only phase control is required to allow focusing and steering of the beam.

FIG. 10 schematically illustrates a variation of the transducer array 802 in FIG. 9 in which the geometry of the second group 920 of elements is not rectangular, and the apodization linearly scales (rather than discretely scales) the output pressure transmitted by (during transmit) and the electrical signal generated by (during receive) of the elements of the periphery. This is achieved in this example through a triangular geometry of the second group 920 of elements in which the apodization decreases in a direction towards the periphery. Again, other geometries, such as hexagonal, irregular, circular, etc. are also contemplated herein. Screen-printing is well suited for such shapes. The configuration of FIG. 10 also does not include the third group 922, or corner elements $904_{1,1}$, $904_{N,1}$, $904_{1,M}$, and $904_{N,M}$. In another variation, the apodization can scale in a non-linear manner, for example, where the geometry of the outer sub-elements in a non-linear. Furthermore, the first group 916 can also have non-linear geometries.

FIG. 11 shows an example of dynamic area controlled apodization for a single one of the elements 904 of the transducer array 802. In FIG. 11, the single element 904 includes a 3x3 arrangement of piezo sub-elements 1102, including a first row $1104_1$ of sub-elements 1102, a second row $1104_2$ of sub-elements 1102, and a third row $1104_3$ of sub-elements 1102, each row including three sub-elements 1102, and a first column $1106_1$ of sub-elements 1102, a second column $1106_2$ of sub-elements 1102, and a third column $1106_3$ of sub-elements 1102, each column including three sub-elements 1102.

A row electrode 1108 is in electrical communication with the sub-elements 1102 of the second row $1104_2$. A first plurality of switches 1110 and 1112 respectively selectively electrically connect the sub-elements 1102 of the first row $1104_1$ and the sub-elements 1102 of the third row $1104_3$ to the row electrode 1108. As such, the area of the illustrated element 904 can be dynamically changed, row-wise, between three different discrete area levels. The levels include: only the second row $1104_2$; the second row $1104_2$ and either the first row $1104_1$ or the third row $1104_3$, and all three rows.

A column electrode 1114 is in electrical communication with the sub-elements 1102 of the second column $1106_2$. A second plurality of switches 1116 and 1118 respectively selectively electrically connect the sub-elements 1102 of the first column $1106_1$ and the sub-elements 1102 of the third column $1106_3$ to the column electrode 1114. As such, the area of the illustrated element 904 can be dynamically changed, column-wise, between three different discrete area levels. The levels include: only the second row $1106_2$; the second row $1106_2$ and either the first row $1106_1$ or the third row $1106_3$, and all three rows.

Combining the switching of the rows and columns, the area of the illustrated element 904 can be dynamically changed between nine different discrete area levels. This includes only the central sub-elements 1102 up to all of the sub-elements 1102.

Generally, if the number of enabled switches in row i is denoted $k_i$, and the number of enabled switches in column j is denoted the area apodization A of element (i; j) is $A(i; j)=k_i \times k_j$. Any separable 2-D function can be implemented as an apodization function. The number of switches per row or column for k×k cells per element can in principle be reduced to 2k−2, as this—together with the possibility of not reading out the signal from a row or column—allows any number of cells in a given element to be active.

Figure 12:
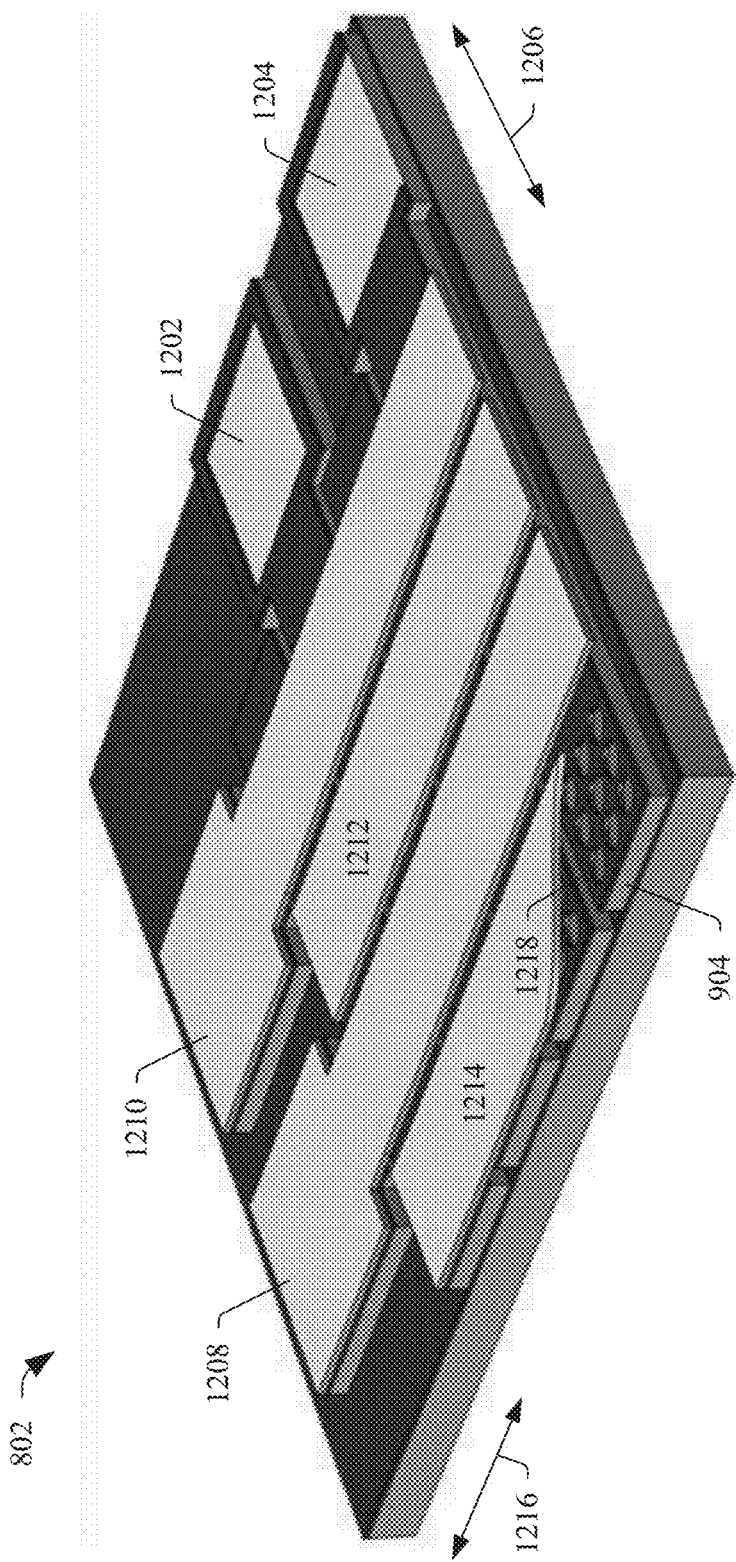
FIG. 12 schematically illustrates an example of a CMUT 2D transducer array.
Figure 13:
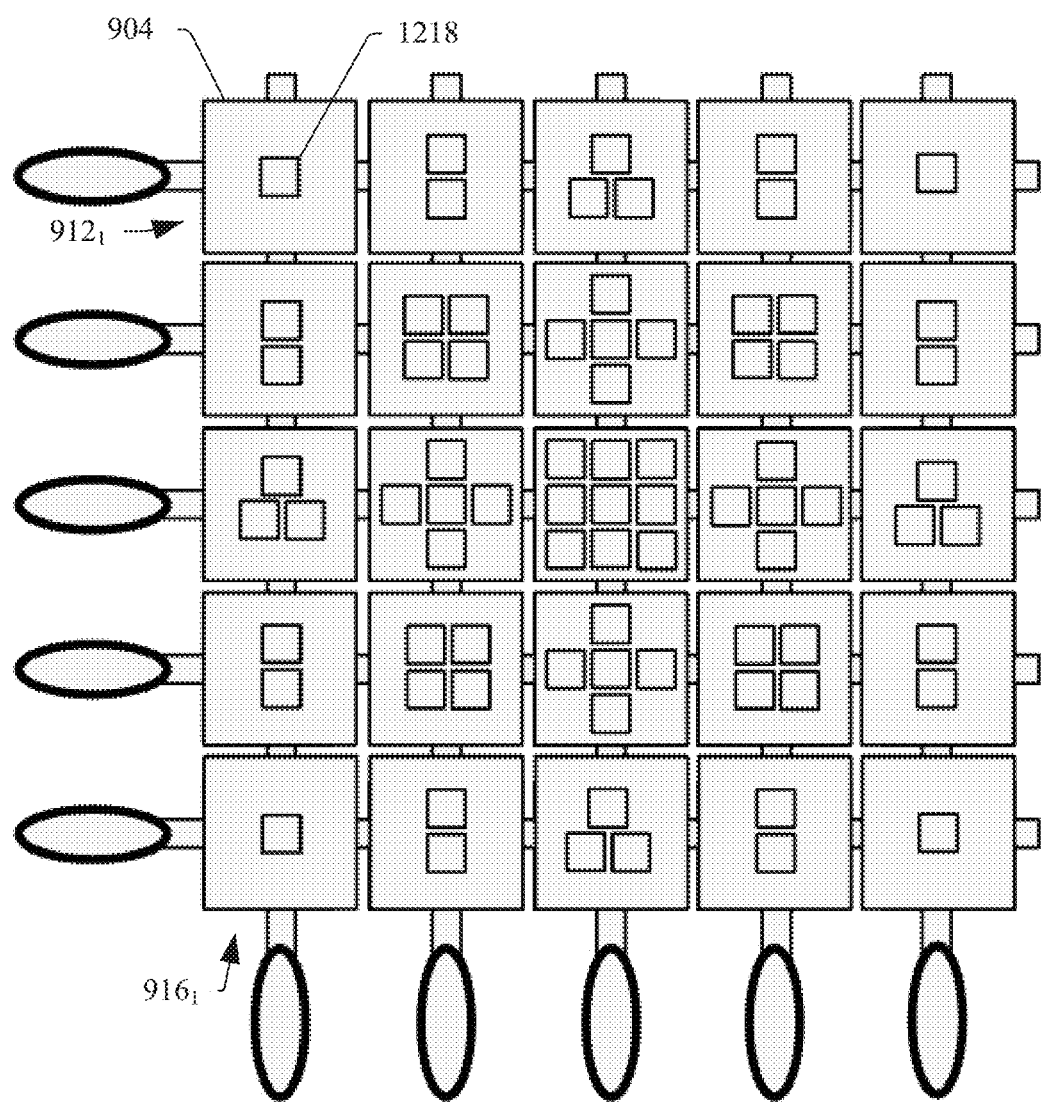
FIG. 13 schematically illustrates an example of fixed area controlled apodization in connection with a CMUT 2D transducer array.
Figure 14:
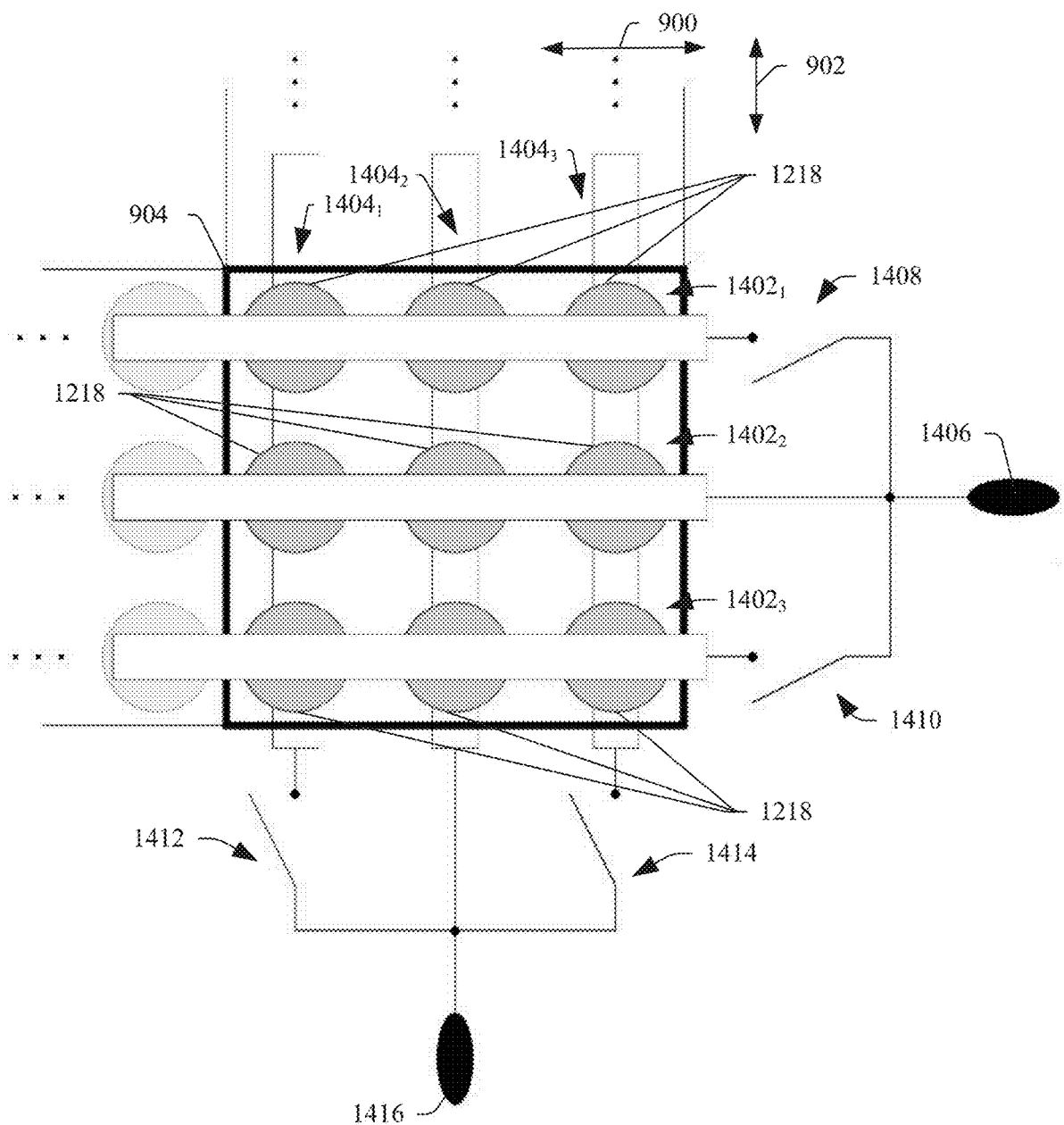
FIG. 14 schematically illustrates an example of dynamic area controlled apodization in connection with a CMUT 2D transducer array.

FIGS. 12, 13, and 14 shows examples of area controlled apodization where the transducer array 802 includes a CMUT transducer array. FIG. 12 shows a sub-portion of a CMUT transducer array 802. FIG. 13 shows an example of fixed area controlled apodization. FIG. 14 shows an example of dynamic area controlled apodization.

In FIG. 12, the sub-portion of the transducer array 802 includes two line elements 1202 and 1204 in one direction 1206 and four line elements 1208, 1210, 1212 and 1214 in a different direction 1216. An element 904 includes X×Y cells 1218, where X and Y are positive integers, and X=Y or X≠Y. Different elements 904 may have the same or a different number of cells 1218.

In FIG. 13, X=Y=5, arranged as a 5×5 matrix, or 25 elements 904. For sake of clarity and explanatory purposes, only reference numerals for a single element 904 and a single cell 1218 of the element 904 are provided. For the other components, the description of FIG. 9 can be referenced. In FIG. 13, the transducing area of each element 904 is fixed by the number of cells 1218 which populate the element 904. That is, an element 904 with twice the number of cells 1218 as another element 904 will have twice the transducing area as the other element 904.

By way of example, for the row line element $912_1$, element 1,1 includes a single cell 1218, element 1,2 includes two cells 1218, the element 1,3 includes three cells 1218, element 1,4 includes two cells 1218, and element 1,5 includes one cell 1218. As such, the elements 1,2 and 1,3 have twice the transducing area as the elements 1,1 and 1,4, and the element 1,3 has three times the transducing area as the elements 1,1 and 1,4. In this embodiment, a similar pattern is followed for the column line element $916_1$. That is, the element 1,1 includes a single cell 1218, element 2,1 includes two cells 1218, element 3,1 includes three cells 1218, element 4,1 includes two cells 1218, and element 5,1 includes one cell 1218.

As shown in the illustrated embodiment, the center element 3,3 includes nine cells 1218. The elements (element 3,2; element 2,3; element 4,3; element 3,4) adjacent to the center element 3,3 each include five cells 1218. The elements (element 2,2; element 4,2; element 2,4; element 4,4) at the corners of the element 3,3 each include four cells 1218. The elements along the periphery and at the corners include less than four cells 1218. With this configuration, the apodization rolls off from the center element 3,3 to the edge elements as a function of a distance from the center element 3,3 to each of the other elements 904. Again, this has the effect of down waiting the edge sub-elements, mitigating ghost artifact introduced thereby. The geometry of each element 904 can be the same or different.

Generally, a size of each cell 1218 is determined by the desired fundamental resonant frequency of the transducer array 802. The active or transducing area of an element 904 is adjusted by varying the number of cells 1218 per element 904. With the geometry in FIG. 13, the element 3,3 has nine (9) discrete apodization levels, and the other elements 907 have less than nine discrete apodization levels, or a number of discrete apodization levels determined by the number of cells 1218. A given transducer element 904 pitch and cell 1218 pitch defines a maximum number of cells per element 904, and the apodization profile is discretized into a number of levels equal to the maximum number of cells per element 904.

FIG. 14 shows an example of dynamic area controlled apodization. In FIG. 14, a single element 904 includes a 3×3 arrangement of CMUT cells 1218, including a first row $1402_1$ of CMUT cells 1218, a second row $1402_2$ of CMUT cells 1218, and a third row $1402_3$ of CMUT cells 1218, each row including three CMUT cells 1218, and a first column $1404_1$ of CMUT cells 1218, a second column $1404_2$ of CMUT cells 1218, and a third column $1404_3$ of CMUT cells 1218, each column including three CMUT cells 1218.

A row electrode 1406 is in electrical communication with the cells of the second row $1402_2$. A first plurality of switches 1408 and 1410 respectively selectively electrically connect the cells of the first row $1402_1$ and the cells of the third row $1402_3$ to the row electrode 1406. As such, the area of the illustrated element 904 can be dynamically changed, row-wise, between three different discrete area levels. The levels include: only the second row $1402_2$; the second row $1402_2$ and either the first row $1402_1$ or the third row $1102_3$, and all three rows.

A column electrode 1416 is in electrical communication with the cells of the second column $1404_2$. A second plurality of switches 1412 and 1414 respectively selectively electrically connect the cells of the first column $1404_1$ and the cells of the third column $1404_3$ to the column electrode 1416. As such, the area of the illustrated element 904 can be dynamically changed, column-wise, between three different discrete area levels. The levels include: only the second row $1404_2$; the second row $1404_2$ and either the first row $1404_1$ or the third row $1404_3$, and all three rows.

Combining the switching of the rows and columns, the area of the illustrated element 904 can be dynamically changed between nine different discrete area levels. This includes only the central CMUT cell 1218 up to all of the CMUT cells 1218. Similar to the piezoelectric element 904 of FIG. 11, if the number of enabled switches in row i is denoted $k_i$ and the number of enabled switches in column j is denoted the area apodization A of element (i; j) is $A(i; j)=k_i \times kj$. As with fixed area-controlled apodization, dynamic area controlled apodization of row-column addressed arrays offers 2N transmit and receive connections to an N×N transducer array since the switches can be operated from a pre-programmed independent circuit.

Figure 15:
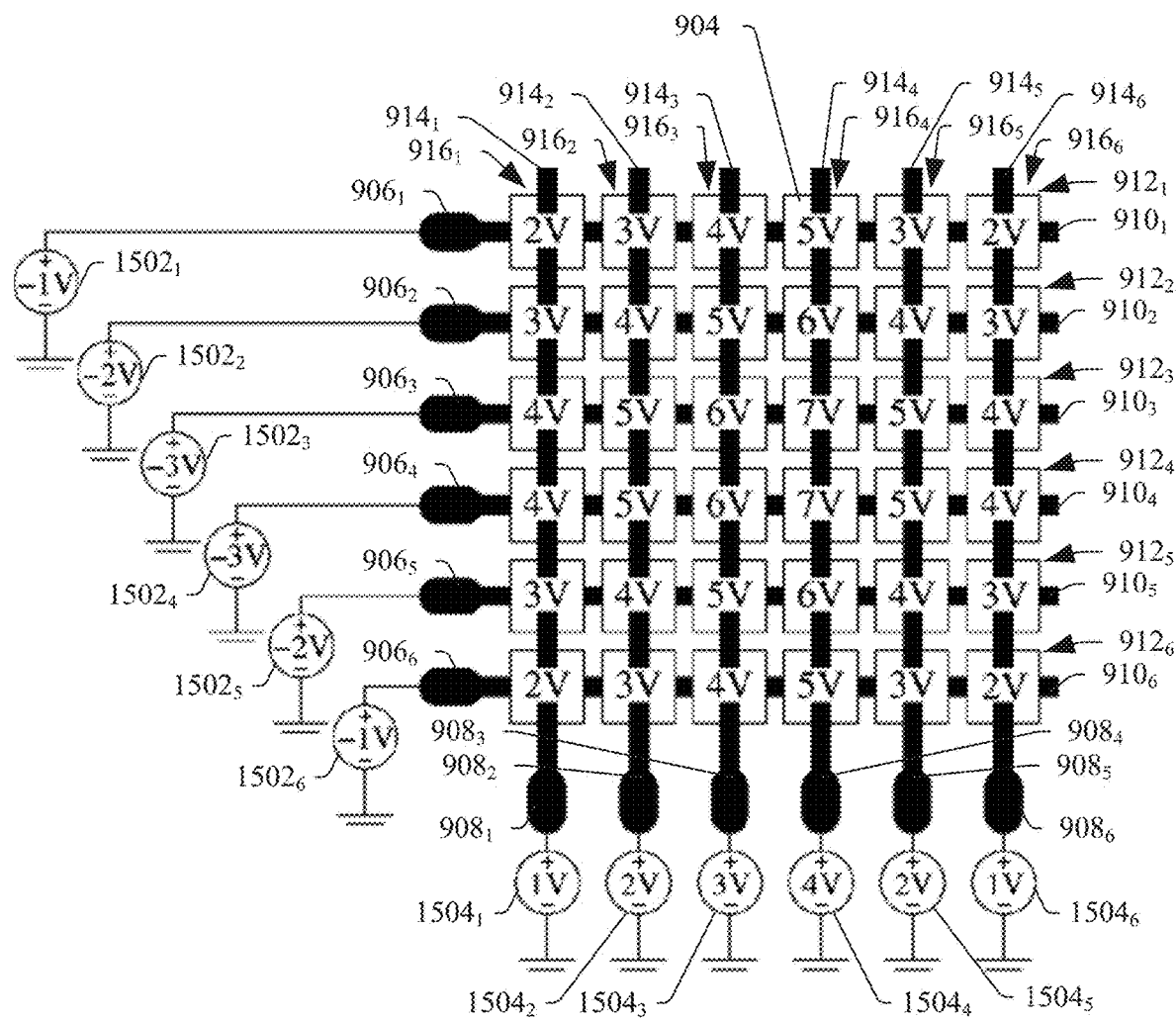
FIG. 15 schematically illustrates an example of bias controlled apodization in connection with a CMUT 2D transducer array.

FIG. 15 shows an example of bias controlled apodization in connection with a CMUT transducer array 802. For sake of clarity and explanatory purposes, this example includes a 6×6 array. However, it is to be understood that smaller and larger arrays, and non-square arrays are also contemplated herein. It is also to be understood that the illustrated voltage levels are also provided for explanatory purposes and are not limiting; other voltage levels are contemplated herein.

The transducer array 802 includes the electrical contacts $906_1, \ldots, 906_6$, each electrically connected to a plurality of the elements 904 via the electrically conductive elements $910_1, \ldots, 910_6$, forming the row line elements $912_1, \ldots, 912_6$. The array 802 further includes the electrical contacts $908_1, \ldots, 908_6$, each electrically connected to a plurality of elements 904 via the electrically conductive elements $914_1, \ldots, 914_6$, forming the column line elements $916_1, \ldots, 916_6$.

In this example, the transducer array 802 further includes a first set of direct current (DC) voltage sources $1502_1, \ldots, 1502_6$, and a second set of DC voltage sources $1504_1, \ldots, 1504_6$. The first set of DC voltage sources $1502_1, \ldots, 1502_6$ respectively are electrically connected to the electrical contacts $906_1, \ldots, 906_6$, and the second set of DC voltage sources $1504_1, \ldots, 1504_6$ respectively are electrically connected to the electrical contacts $908_1, \ldots, 908_6$.

The DC voltages generate a map of voltage differences over the sub-elements of the array 802. In general, if the DC bias voltage applied to the i'th row is denoted r(i) and the DC bias voltage applied to the j'th column is denoted c(j), then the bias voltage of element (i; j) is given by $V_{DC}(i; j)=|r(i)-c(j)|$. As the apodization of the individual sub-elements in terms of power scaling is a function of only $V_{DC}(i; j)$ for a given operating frequency, DC bias control allows application of any apodization profile over the entire 2D array that can be described as the sum of two arbitrary discrete 1D functions.

Since the number apodization levels are not limited by the number of cells per sub-element, the DC bias voltage can take any level. Bias-controlled apodization can be implemented as either a fixed or a dynamic apodization. In the first case, a simple voltage divider circuit can be implemented next to the transducer, and the apodization profile is fixed, but the apodization levels are continuous. For dynamic DC bias, a slightly more complicated electronic circuit has to be designed; however, usually only a small number of pre-defined apodization profiles are needed, so these could be pre-programmed and switched between by an external IC.

With dynamic DC bias voltage control apodization, time gain compensation can be directly integrated into the transducer array 802. By ramping up the DC bias voltage during receive, the signals from the transducer array 802 are effectively time gain compensated, and only a weaker subsequent time dependent amplification of the signals are needed.

Figure 16:
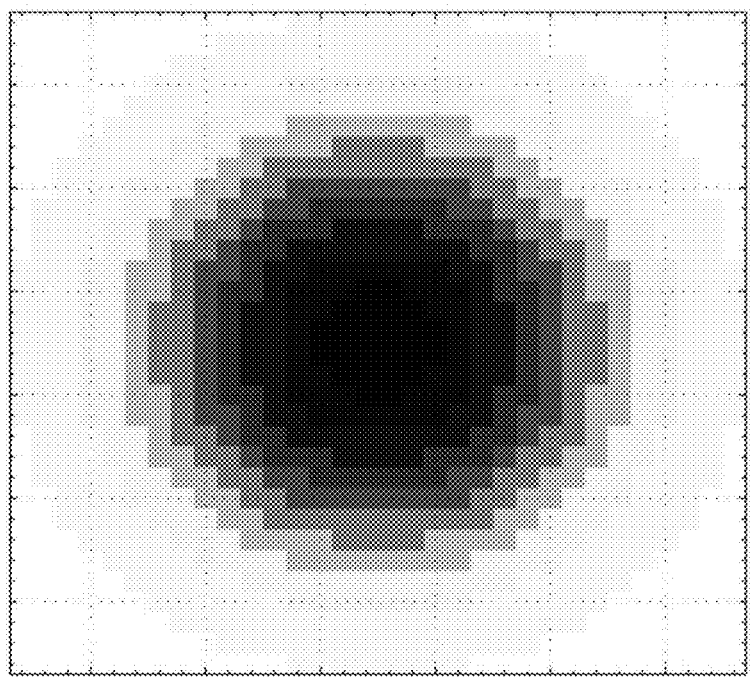
FIG. 16 schematically illustrates an example of area apodization with nine apodization levels that are set as a rotationally symmetric 2D Hann window.
Figure 17:
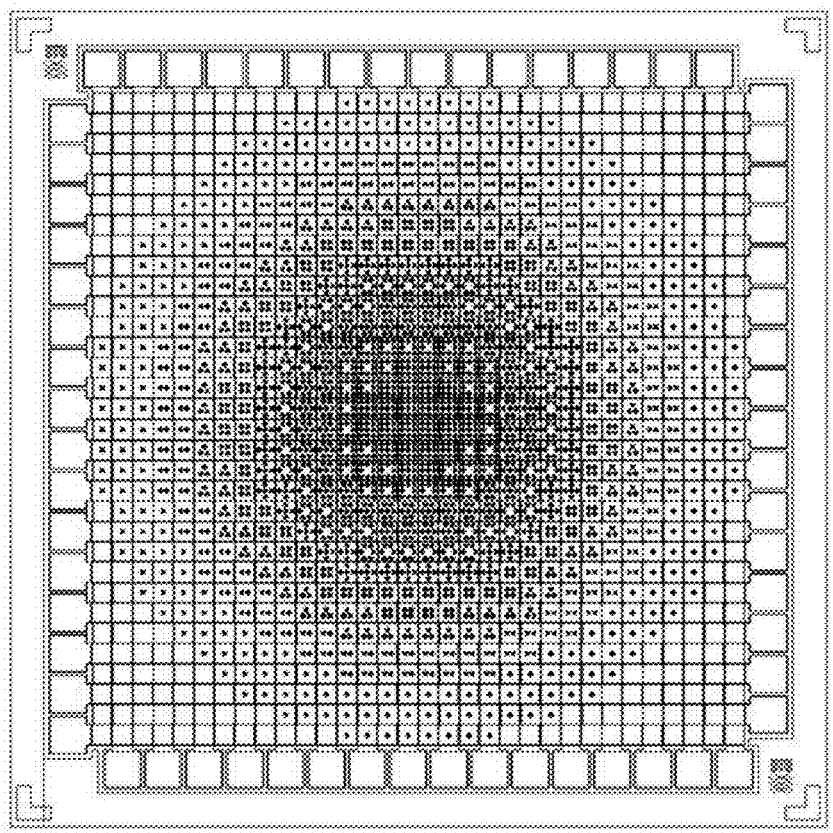
FIG. 17 schematically illustrates an example mask layout for the apodization of FIG. 16.

FIGS. 16 and 17 illustrate an example of integrated fixed area apodization for the symmetry axis normal to the array 802. In this instance, the suppression of ghost echoes from a point scatterer located on the symmetry axis normal to the transducer is achieved by applying a rotationally symmetric apodization profile to the transducer. For a CMUT array with 9 cells per sub-element, there are nine (9) apodization levels. A discretized version of a 2D Hann window with 9 levels on a 32×32 array is shown in FIG. 16, and the corresponding mask layout for the CMUT array is shown in FIG. 17. Other suitable windows include, but are not limited to, a Hamming, a linear, a Gaussian, and/or other discrete and/or continuous windows.

For point scatterers located away from the symmetry axis normal to the transducer, the main echo will be damped, as the active area of the sub-elements directly beneath it is reduced. Consequently, the resulting image will have a decreasing signal-to-noise ratio (SNR) as a function of the point scatterer's distance from the symmetry axis. In order to address this issue, a second layout is proposed.

Figure 18:
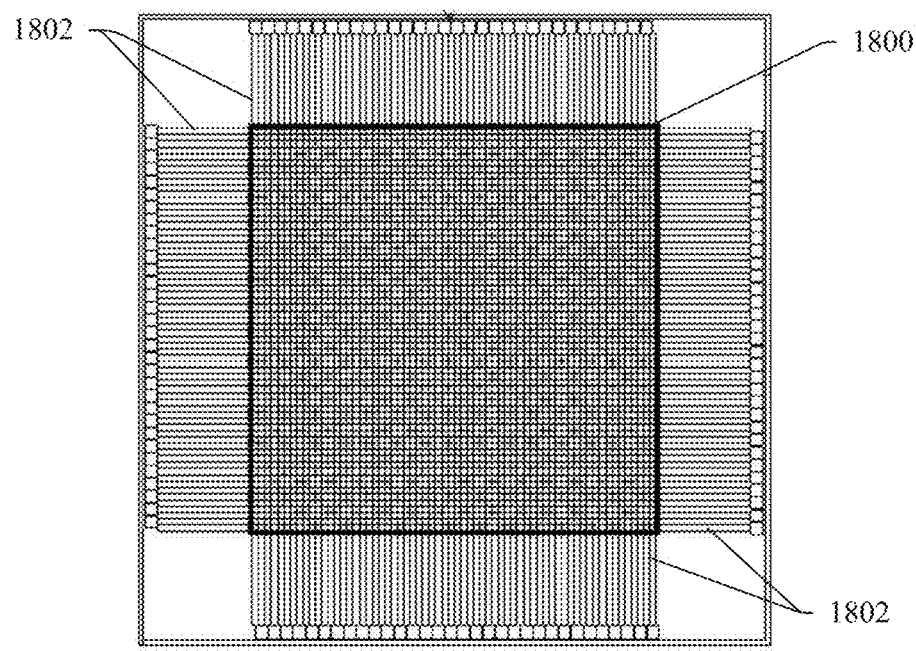
FIG. 18 illustrates an example of integrated fixed area apodization enabling homogeneous rectilinear imaging with optional beam steering.

FIG. 18 illustrates an example of apodization enabling homogeneous rectilinear imaging with optional beam steering. Using fixed area apodization as an example, the layout in FIG. 18 consists of a 2-D row-column addressed array 1800 with all elements having the same (maximum) active area. On each end of the line elements, an apodization element 1802 is attached in which the active area is gradually decreased from a full active area next to the line element to zero active area at the opposing end (the edge of the entire array). With this approach, all point scatterers imaged using rectilinear imaging will experience the same apodization and exhibit the same SNR. In general, the layout in FIG. 18 can be used in connection with area apodization (e.g., the example of FIG. 21), bias apodization, damping material, and/or apodization. Damping materials are discussed in Demore et al., "Real-Time Volume Imaging Using a Crossed Electrode Array," IEEE Transactions on Ultrasonics, Ferroelectrics, and Frequency Control, vol. 56, no. 6, June 2009.

Beam steering can be employed through a modification: If the apodization elements located in the direction of the beam steering are turned off, the main echo from a point scatterer located will reach the non-apodized part of the line elements first, hence resulting in a full amplitude response. The transmitted/received signal from CMUTs is negligible if no DC bias is applied. By providing four separate DC bias supplies to the apodization elements located on the four sides of the array (or providing four switches, using floating ground, etc.), the apodization elements can be turned on and off in these four groups.

Figure 21:
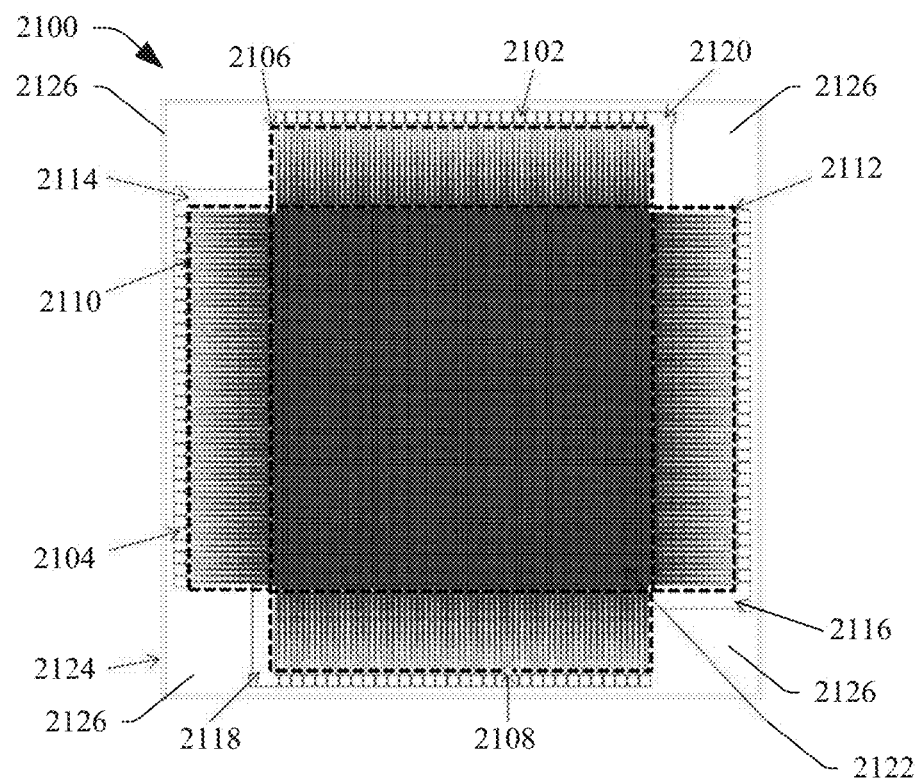
FIG. 21 illustrates an example mask layout for a CMUT using the apodization described in connection with FIG. 18.

FIG. 21 illustrates an example mask layout 2100. In contrast to the embodiment discussed in connection with FIGS. 16 and 17, in which the array includes a rotationally symmetric apodization profile, this layout is not rotationally symmetric to the axis normal to the array 802. Rather, a same apodization pattern is employed apodization elements which are located only at the end of each 1D array.

In the illustrated example, each of the 1D arrays is a line element that includes a first end, a second end and a middle region there between, and apodization is only at the first and second end regions of each of the 1D arrays, and not at the middle region of each of the 1D arrays. The illustrated mask layout 2100 includes column contacts 2102 and row contacts 2104.

The mask layout 2100 further includes a first group 2106 of column apodization elements and a second group 2108 of column apodization elements. The mask layout 2100 further includes a third group 2110 of row apodization elements and a fourth group 2112 of row apodization elements. As shown, the first, second, third and fourth groups 2106, 2108, 2110, and 2112 of apodization elements are located only at the first and second ends of each 1D array, and not at the middle region of the 1D arrays.

The mask layout 2100 further includes first row contacts 2114 to apodization elements in the first group 2106, and second row contacts 2116 to apodization elements in the second group 2108. The mask layout 2100 further includes third column contacts 2118 to apodization elements in the third group 2110, and fourth column contacts 2120 to apodization elements in the fourth group 2112.

The mask layout 2100 further includes a non-apodized region 2122, which corresponds to only the middle regions of the 1D arrays, and not the first and second ends of the 1D arrays. In this example, the non-apodized region 2122 is a rectangular region about a center of the array, in a central region within the boundary of the first, second, third and fourth groups 2106, 2108, 2110, and 2112 of the apodization elements.

The mask layout 2100 is shown inside of a chip border 2124. Corner regions 2126 do not include any elements. The corner regions 2126 are rectangular shaped. One side of each corner regions 2126 is adjacent to apodized rows elements. Another side of each corner regions 2126 is adjacent to apodized column elements. The two sides intersect at a corner at which the corresponding corner region 2126 is adjacent to the non-apodized region 2122.

Figure 1:
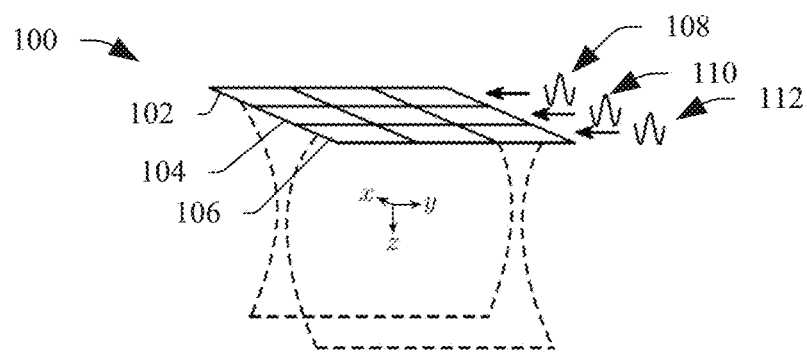
FIG. 1 schematically illustrates prior art row or column addressing for transmit or receive in connection with a 2D transducer array.
Figure 2:
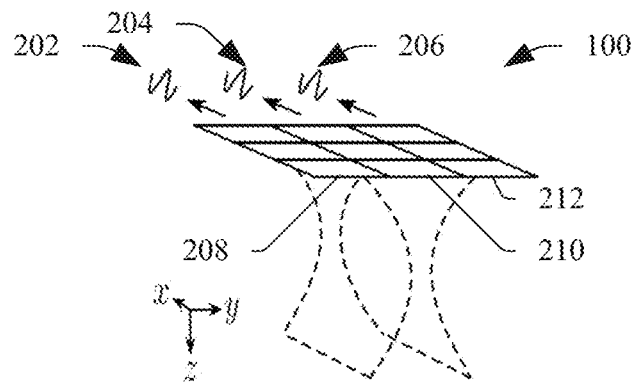
FIG. 2 schematically illustrates prior art column or row addressing for receive or transmit in connection with a 2D transducer array.
Figure 3:
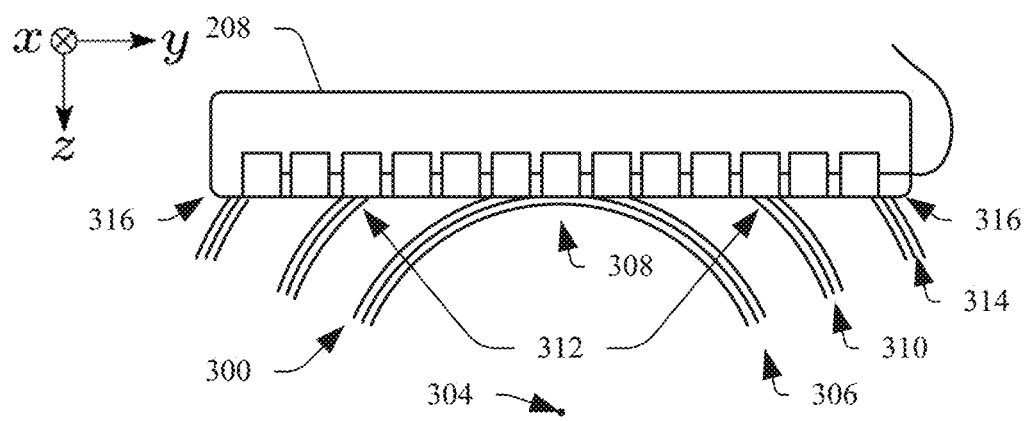
FIG. 3 schematically illustrates prior art interaction of a wave reflected by a point scatterer with a 1D array of a 2D transducer array at three different points in time.
Figure 4:
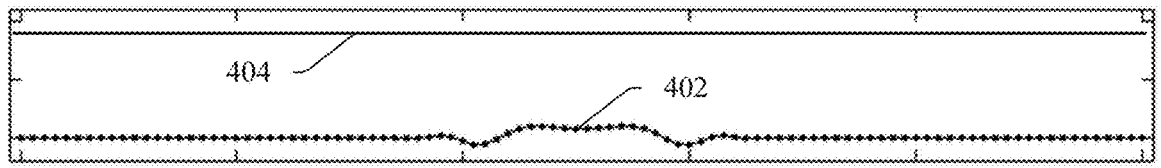
FIG. 4 graphically illustrates a prior art response and output of the 1D array of FIG. 3 at a first of the three points in time.
Figure 5:
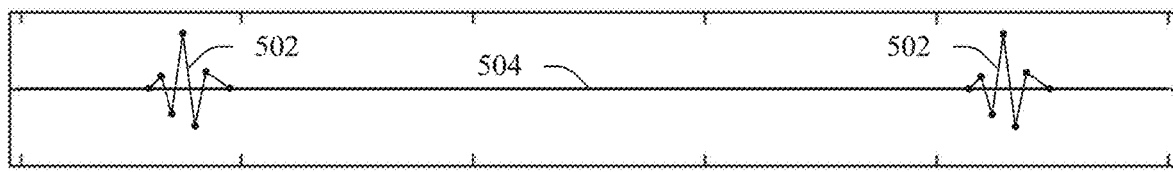
FIG. 5 graphically illustrates a prior art response and output of the 1D array of FIG. 3 at a second of the three points in time.
Figure 6:
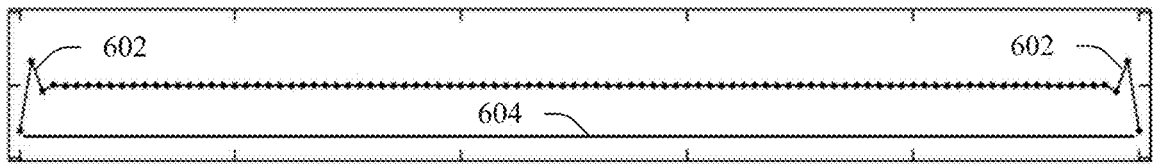
FIG. 6 graphically illustrates a prior art response and output of the 1D array of FIG. 3 at a third of the three points in time.
Figure 7:
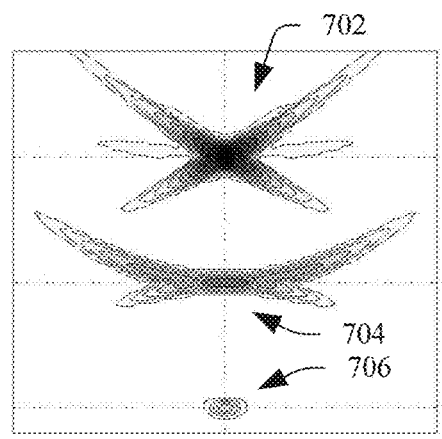
FIG. 7 graphically illustrates a main lobe and ghost lobes in connection with the prior art row-column addressing of FIGS. 1-6.
Figure 19:
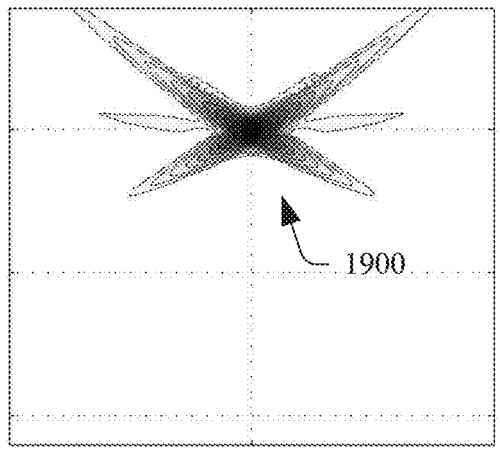
FIG. 19 graphically illustrates a main lobe in connection with the row-column addressing of FIGS. 8 and 17.

FIG. 19 graphically illustrates the output of the transducer array 208 in connection with the row-column addressing of described herein, for example, in connection with FIGS. 8-18. From FIG. 19, the output includes only a main lobe 1900 (and no ghost lobes). For comparative purposes, FIG. 7 graphically illustrates the row-column addressing of discussed in connection with FIGS. 1 and 2. In FIG. 7, the output includes a main lobe 702 as well as ghost lobes 704 and 706.

In the above, the focus has been on 2-D transducer arrays utilizing row-column addressing. However, as 2-D row-column addressed arrays are essentially two 1-D arrays orthogonal to each other, the described apodization techniques and time gain compensation can also be applied to 1-D arrays. For low-end ultrasound scanners that do not incorporate the extra electronics needed to apply transmit apodization, a static apodization can be implemented directly in the transducer using these techniques.

Another possible use of these techniques is to improve the out-of-plane performance by apodizing 1-D arrays in the out-of-plane direction. This out-of-plane apodization could either be fixed or dynamic. If the apodization is fixed, it would not influence how the ultrasound scanner uses the transducer nor would it lead to extra connections. Fixed area-controlled apodization can be incorporated in both CMUTs and piezoelectric transducers. In 1-D piezoelectric arrays the fixed area apodization can be changed by e.g. widening the dicing trenches in the crystal.

Figure 20:
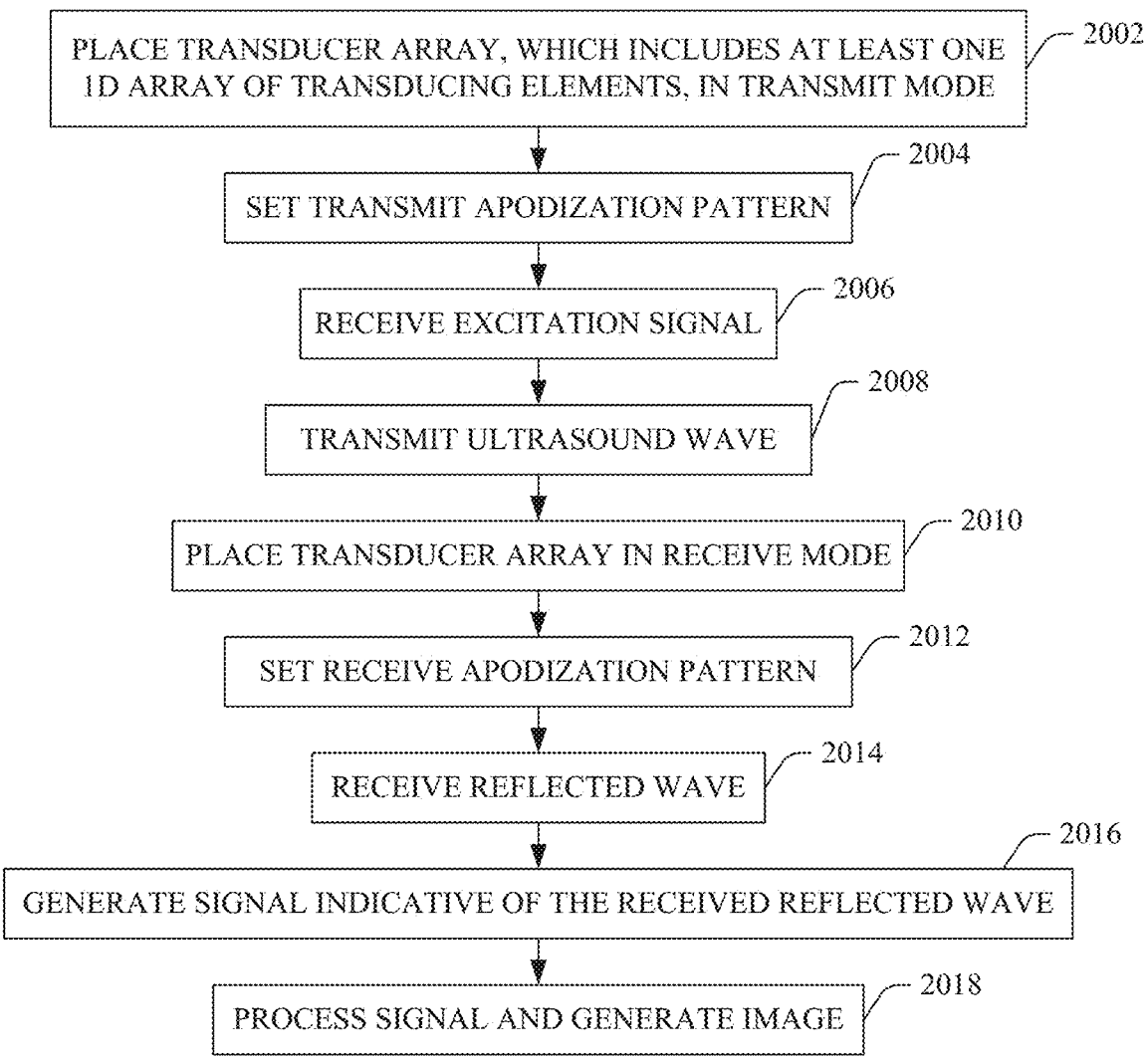
FIG. 20 illustrates a method in accordance with the embodiments discussed herein.

FIG. 20 illustrates an example method.

It is to be understood that the following acts are provided for explanatory purposes and are not limiting. As such, one or more of the acts may be omitted, one or more acts may be added, one or more acts may occur in a different order (including simultaneously with another act), etc.

At 2002, a transmit mode signal is received, placing a transducer array that includes at least one 1D array of transducing elements with integrated apodization in transmit mode.

At 2004, optionally, where the apodization is dynamic, a transmit apodization pattern signal is received setting the transmit apodization pattern.

At 2006, an excitation signal is received by the transducer array.

At 2008, the at least one 1D array of transducing elements transmits an ultrasound wave in response to receiving the excitation signal.

At 2010, a receive mode signal is received placing the transducer array in receive mode.

At 2012, optionally, where the apodization is dynamic, a receive apodization pattern signal is received setting the receive apodization pattern.

At 2014, a reflected wave, generated in response to an interaction of the transmitted ultrasound wave with structure, is received by the at least one 1D array of transducing elements or another the at least one 1D array of transducing elements.

At 2016, the at least one 1D array of transducing elements receiving the reflected wave generates a signal indicative thereof.

At 2018, the generate signal is processed and at least image is generated based thereon.

The methods described herein may be implemented via one or more computer processors (e.g., a micro-processor, a central processing unit (cpu), etc.) executing one or more computer readable instructions encoded or embodied on computer readable storage medium (which excludes transitory medium) such as physical memory which causes the one or more processors to carry out the various acts and/or other functions and/or acts. Additionally or alternatively, the one or more processors can execute instructions carried by transitory medium such as a signal or carrier wave.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. A system, comprising:
    at least one 1-D array, including:
        a plurality of transducing elements, wherein at least one transducing element of the plurality of transducing elements includes a plurality of rows of sub-elements;
        a row electrode; and
        a row switch configured to electrically connect one row of the plurality of rows to the row electrode for a first dynamically controlled row area apodization and concurrently electrically connect at least two rows of the plurality of rows for a second dynamically controlled row area apodization.

2. The system array of claim 1, further comprising:
    a pre-programmed circuit that controls the switches to connect either the one row of the plurality of rows to the row electrode for the first dynamically controlled row area apodization or the at least two rows of the plurality of rows for the second dynamically controlled row area apodization.

3. The system array of claim 2, wherein the column switch electrically connects more than two columns but less than all of the columns to the column electrode for the second dynamically controlled row area apodization.

4. The system array of claim 1, wherein the at least one transducing element of the plurality of transducing elements further includes a plurality of columns of sub-elements, the at least one 1-D array further includes a column electrode, and the at least one 1-D array further includes a column switch configured to electrically connect one column of the plurality of columns to the column electrode for a first dynamically controlled column area apodization and concurrently electrically connect at least two columns of the plurality of columns for a second dynamically controlled column area apodization.

5. The system array of claim 4, further comprising:
    a pre-programmed circuit that controls the switches to connect either the one column of the plurality of columns to the column electrode for the first dynamically controlled column area apodization or the at least two columns of the plurality of columns for the second dynamically controlled column area apodization.

6. The system array of claim 4, further comprising:
    a pre-programmed circuit that controls the switches to connect either the one row of the plurality of rows to the row electrode for the first dynamically controlled row area apodization or the at least two rows of the plurality of rows for the second dynamically controlled row area apodization.

7. The system array of claim 6, further comprising:
    a pre-programmed circuit that controls the switches to connect either the one column of the plurality of columns to the column electrode for the first dynamically controlled column area apodization or the at least two columns of the plurality of columns for the second dynamically controlled column area apodization.

8. The system array of claim 1, wherein sub-elements include a piezoelectric transducing sub-element.

9. The system array of claim 1, wherein sub-elements include a capacitive micro machined ultrasonic transducing sub-element.

10. The system array of claim 1, wherein the row switch electrically connects more than two rows but less than all of the rows to the row electrode for the first dynamically controlled row area apodization.

11. A method, comprising:
transmitting an ultrasound waveform with a transducer array that includes dynamically controlled area apodization that is integrated into physical elements of the transducer array;
wherein the dynamically controlled area apodization comprises:
switching a row switch to electrically connect one row of a plurality of rows of physical elements to a row electrode for a first dynamically controlled row area apodization, and
concurrently electrically connecting at least two rows of the plurality of rows of physical elements for a second dynamically controlled row area apodization;
receiving a reflected wave with the transducer array; and
processing the received reflected wave to generate at least one image.

12. The method of claim 11, wherein the row switch electrically connects more than two rows but less than all of the rows to the row electrode for the first dynamically controlled row area apodization.

13. The method of claim 11, further comprising: switching a column switch to electrically connect one column of a plurality of columns of physical elements to a column electrode for a first dynamically controlled column area apodization and to concurrently electrically connect at least two columns of the plurality of columns of physical elements for a second dynamically controlled column area apodization.

14. The method of claim 11, further comprising:
switching a column switch to electrically connect one column of a plurality of columns of physical elements to a column electrode for a first dynamically controlled column area apodization and to concurrently electrically connect at least two columns of the plurality of columns of physical elements for a second dynamically controlled column area apodization.

15. The method of claim 14, wherein the column switch electrically connects more than two columns but less than all of the columns to the column electrode for the second dynamically controlled row area apodization.

16. The method of claim 14, further comprising:
switching a row switch to electrically connect one row of a plurality of rows of physical elements to a row electrode for a first dynamically controlled row area apodization and to concurrently electrically connect at least two rows of the plurality of rows of physical elements for a second dynamically controlled row area apodization.

* * * * *